United States Patent
Naiki et al.

(10) Patent No.: US 11,979,930 B2
(45) Date of Patent: May 7, 2024

(54) CONTROL DEVICE, NON-TRANSITORY STORAGE MEDIUM, AND SYSTEM

(71) Applicant: KABUSHIKI KAISHA TOKAI RIKA DENKI SEISAKUSHO, Aichi (JP)

(72) Inventors: Kazuki Naiki, Aichi (JP); Kenichi Koga, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 337 days.

(21) Appl. No.: 17/346,764

(22) Filed: Jun. 14, 2021

(65) Prior Publication Data

US 2022/0039182 A1    Feb. 3, 2022

(30) Foreign Application Priority Data

Jul. 30, 2020   (JP) ................................. 2020-128974

(51) Int. Cl.
| | | |
|---|---|---|
| *H04W 52/24* | (2009.01) | |
| *H04W 52/02* | (2009.01) | |
| *H04W 72/04* | (2023.01) | |
| *H04W 72/0453* | (2023.01) | |
| *H04W 76/14* | (2018.01) | |
| *H04W 76/15* | (2018.01) | |

(52) U.S. Cl.
CPC ....... *H04W 76/15* (2018.02); *H04W 52/0245* (2013.01); *H04W 52/245* (2013.01); *H04W 72/0453* (2013.01); *H04W 76/14* (2018.02)

(58) Field of Classification Search
CPC ... H04W 76/14; H04W 76/15; H04W 52/245; H04W 52/0245; H04W 72/0453
USPC .......................................................... 370/329
See application file for complete search history.

(56) References Cited

U.S. PATENT DOCUMENTS

| | | | |
|---|---|---|---|
| 2016/0269577 A1* | 9/2016 | Sato ..................... | H04W 8/005 |
| 2018/0099643 A1* | 4/2018 | Golsch .................. | G01S 13/765 |
| 2018/0176776 A1* | 6/2018 | Knaappila ............. | H04W 76/14 |
| 2019/0135229 A1 | 5/2019 | Ledvina et al. | |
| 2019/0256047 A1 | 8/2019 | Iwashita et al. | |

(Continued)

FOREIGN PATENT DOCUMENTS

| | | |
|---|---|---|
| JP | 2018-071190 | 5/2018 |
| WO | 2019/067105 | 4/2019 |

*Primary Examiner* — Gbemileke J Onamuti
(74) *Attorney, Agent, or Firm* — Greenblum & Bernstein, P.L.C.

(57) ABSTRACT

Power consumption required for UWB communication is effectively suppressed.
A control device includes: at least one BLE communication section configured to perform BLE communication with another communication device, the BLE communication being wireless communication compliant with BLE communication standards; at least one UWB communication section configured to perform UWB communication with the another communication device, the UWB communication being wireless communication compliant with UWB communication standards; and a control section configured to control the BLE communication of the BLE communication section and the UWB communication of the UWB communication section, and the control section performs control to start the UWB communication in a case where the BLE communication has been established.

14 Claims, 3 Drawing Sheets

(56) References Cited

U.S. PATENT DOCUMENTS

2020/0062217 A1    2/2020   Ledvina et al.
2021/0058252 A1*   2/2021   Jung ................... H04L 9/3263

* cited by examiner

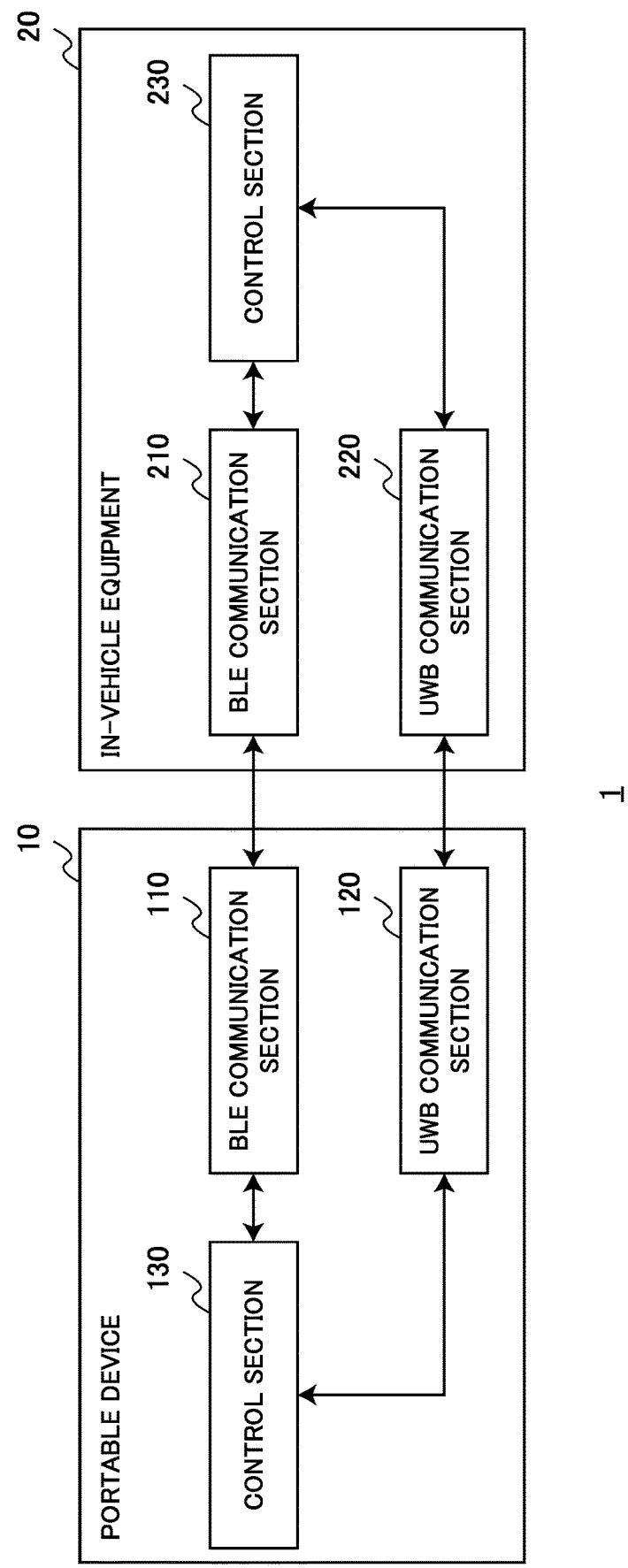

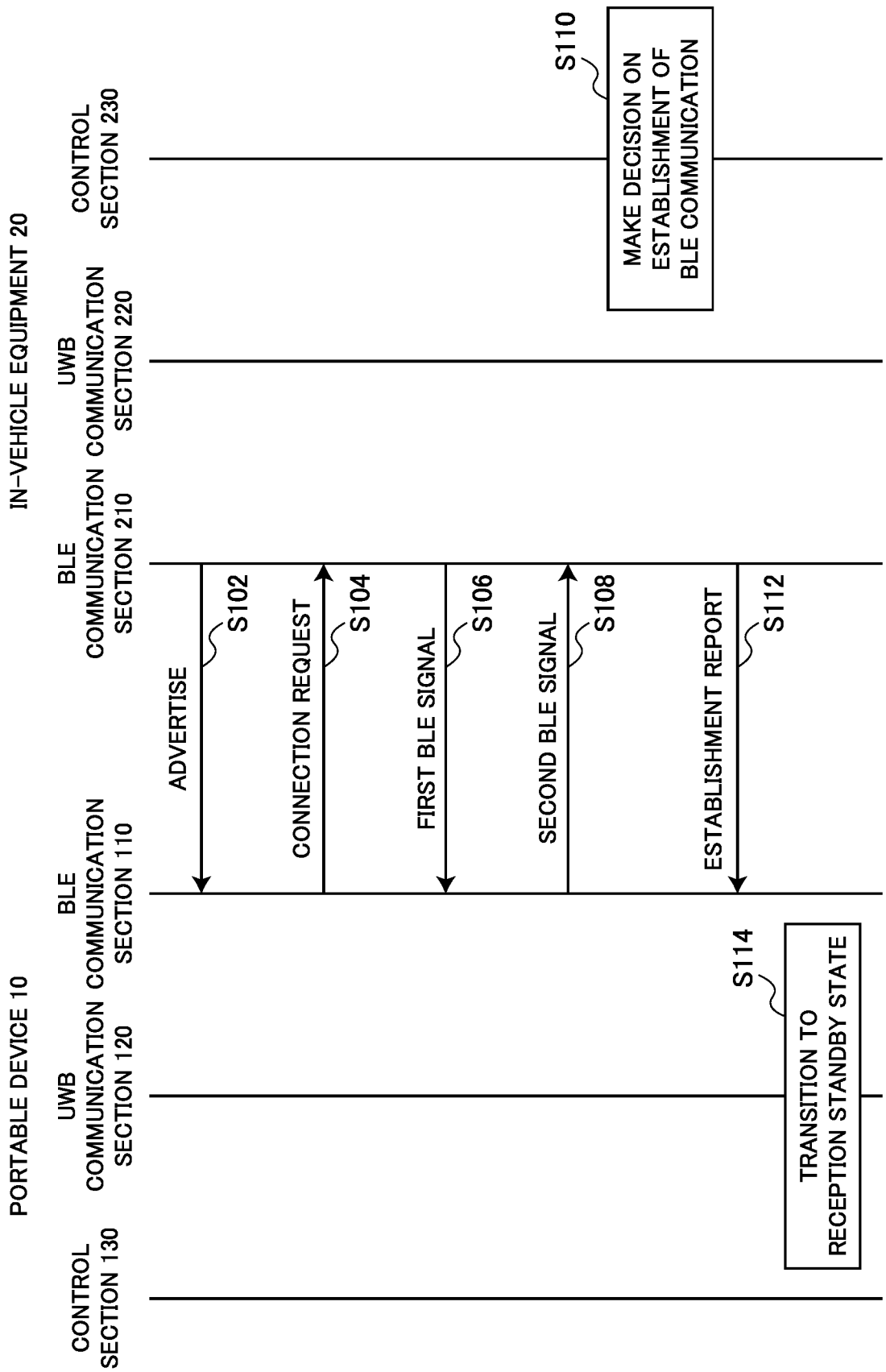

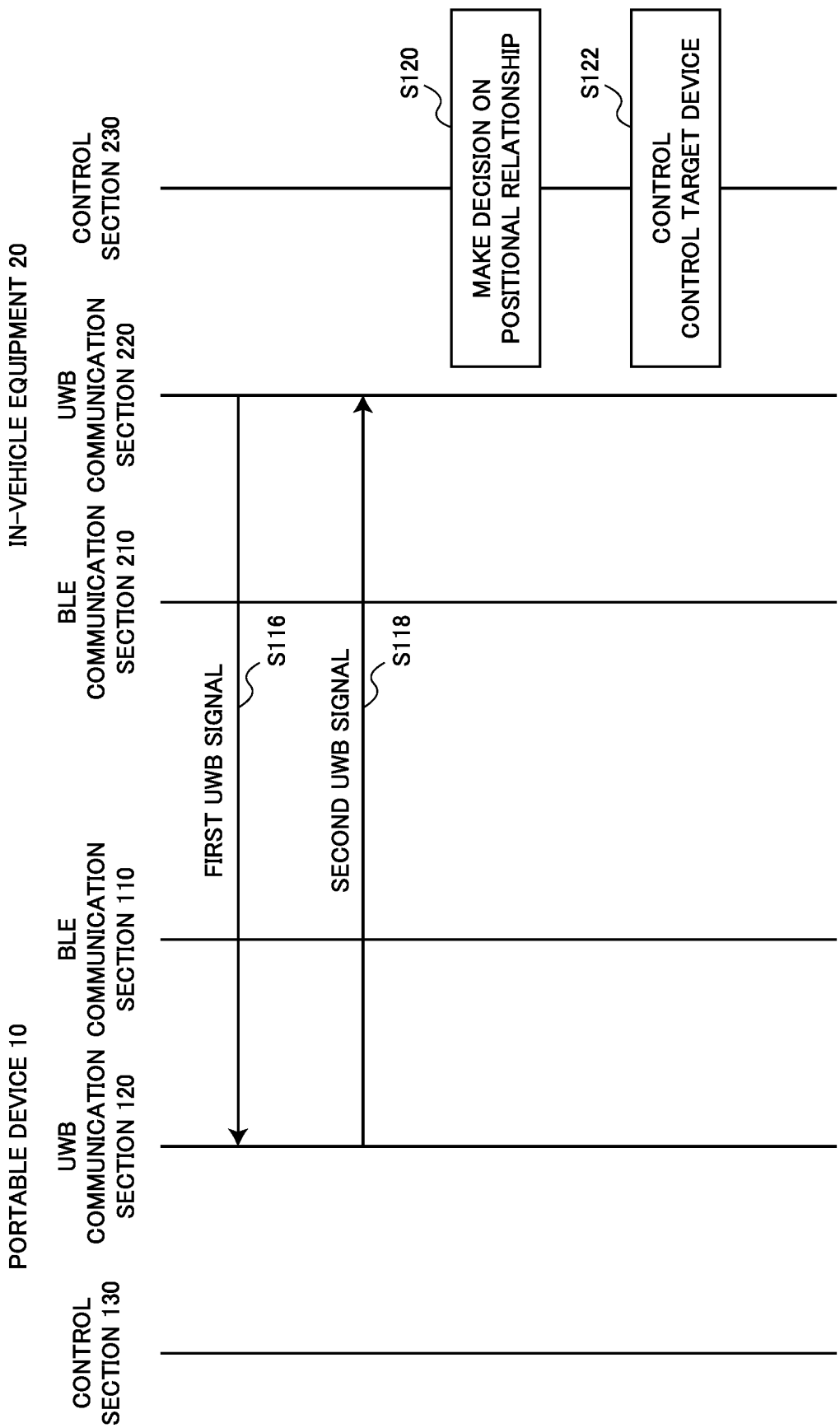

though the BLE communication and the UWB communication. The program further causes the computer to perform control to start the UWB communication with the another communication device in a case where the BLE communication has been established.

Furthermore, to solve the above task, still another aspect of the present invention provides a system that includes: a processor; and a communication device. The processor is configured to: cause Bluetooth® Low Energy (BLE) communication to be performed with the communication device, with the BLE communication being wireless communication compliant with BLE communication standards; cause Ultra Wide Band (UWB) communication to be performed with the communication device, with the UWB communication being wireless communication compliant with UWB communication standards; and control the BLE communication and the UWB communication. The processor performs control to start the UWB communication with the communication device in a case where the BLE communication has been established.

As described above, according to the present invention, it is possible to effectively suppress power consumption required for UWB communication.

CONTROL DEVICE, NON-TRANSITORY STORAGE MEDIUM, AND SYSTEM

CROSS REFERENCE TO RELATED APPLICATION(S)

This application is based upon and claims benefit of priority from Japanese Patent Application No. 2020-128974, filed on Jul. 30, 2020, the entire contents of which are incorporated herein by reference.

BACKGROUND

The present invention relates to a control device, a non-transitory storage medium, and a system.

In recent years, a technology that performs authentication according to a result of transmission and reception of signals between devices has been developed. For example, following JP2018-71190 discloses a system that authenticates a portable device by transmitting and receiving signals between in-vehicle equipment and the portable device, and controls a vehicle according to a result of the authentication.

SUMMARY

The above system performs distance measurement for calculating a distance between the in-vehicle equipment and a portable device by wireless communication of an Ultra Wide Band (UWB), and uses an obtained distance measurement value for authentication. To perform such distance measurement, it is demanded to make one of the in-vehicle equipment and the portable device to stand by in a state where the in-vehicle equipment or the portable device can receive a signal. However, as the above-described standby time becomes longer, power consumption increases.

Therefore, the present invention has been made in light of the above problem, and an object of the present invention is to effectively suppress power consumption required for UWB communication.

To solve the above task, a certain aspect of the present invention provides a control device that includes: a processor; and a memory including at least one program that, when executed by the processor, causes the processor to perform processes. The processes include: causing Bluetooth® Low Energy (BLE) communication to be performed with another communication device, with the BLE communication being wireless communication compliant with BLE communication standards; causing Ultra Wide Band (UWB) communication to be performed with the another communication device, with the UWB communication being wireless communication compliant with UWB communication standards; and controlling the BLE communication and the UWB communication. The processor performs control to start the UWB communication with the another communication device in a case where the BLE communication has been established.

Furthermore, to solve the above task, another aspect of the present invention provides a non-transitory storage medium that has a program that is stored therein. The program causes a computer to realize processes, the processes including: performing Bluetooth® Low Energy (BLE) communication with another communication device, with the BLE communication being wireless communication compliant with BLE communication standards; performing Ultra Wide Band (UWB) communication with the another communication device, with the UWB communication being wireless communication compliant with UWB communication standards;

BRIEF DESCRIPTION OF THE DRAWINGS

FIG. 1 is a block diagram illustrating a configuration example of a system 1 according to an embodiment of the present invention.

FIG. 2 is a sequence diagram illustrating an example of a flow of a process of the system 1 according to the embodiment.

FIG. 3 is a sequence diagram illustrating an example of a flow of a process of the system 1 according to the embodiment.

DETAILED DESCRIPTION OF THE EMBODIMENT(S)

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

<<1.1. System Configuration Example>>

First, a configuration example of a system 1 according to an embodiment of the present invention will be described. FIG. 1 is a block diagram illustrating the configuration example of the system 1 according to the present embodiment. As illustrated in FIG. 1, the system 1 according to the present embodiment includes a portable device 10 and in-vehicle equipment 20.

(Portable Device 10)

First, a functional configuration of the portable device 10 according to the present embodiment will be described. The portable device 10 according to the present embodiment is an information processing device carried by a user who uses a movable body such as a vehicle on which the in-vehicle equipment 20 is mounted. The portable device 10 according to the present embodiment may be, for example, a smartphone or a dedicated device.

Furthermore, the portable device 10 according to the present embodiment is an example of a control device and a communication device according to the present invention.

As illustrated in FIG. 1, the portable device 10 according to the present embodiment includes a BLE communication section 110, a UWB communication section 120, and a control section 130.

(BLE Communication Section 110)

The BLE communication section 110 according to the present embodiment performs BLE communication that is wireless communication compliant with Bluetooth (registered trademark) Low Energy (BLE) communication standards with the in-vehicle equipment 20. BLE communication according to the present embodiment will be separately described in detail.

(UWB Communication Section 120)

The UWB communication section 120 according to the present embodiment performs UWB communication that is wireless communication compliant with UWB communication standards with the in-vehicle equipment 20.

(Control Section 130)

The control section 130 according to the present embodiment controls each component of the portable device 10.

For example, the control section 130 according to the present embodiment controls BLE communication of the BLE communication section 110 and UWB communication of the UWB communication section 120.

In this regard, one of features is that the control section 130 according to the present embodiment performs control to start UWB communication in a case where BLE communication has been established.

According to such control, it is possible to avoid a state where the UWB communication section 120 is enabled to perform UWB communication at all times, and effectively suppress power consumption required for UWB communication.

Note that, more specifically, the control section 130 according to the present embodiment may cause the UWB communication section 120 to start a process related to transmission or reception of signals transmitted and received during UWB communication in a case where BLE communication has been established.

The above signals transmitted and received during UWB communication are, for example, a first UWB signal and a second UWB signal used to estimate a positional relationship between the portable device 10 and the in-vehicle equipment 20.

Furthermore, the above positional relationship between the portable device 10 and the in-vehicle equipment 20 is, for example, a distance between the portable device 10 and the in-vehicle equipment 20.

The distance between the portable device 10 and the in-vehicle equipment 20 is obtained by distance measurement based on the first UWB signal transmitted by one device and the second UWB signal transmitted as a response to the first UWB signal by the other device.

For the above distance measurement, a time $\Delta T1$ from a time at which the one device transmits the first UWB signal to a time at which the one device receives the second UWB signal, and a time $\Delta T2$ from a time at which the other device receives the first UWB signal to a time at which the other device transmits the second UWB signal are used.

More specifically, by subtracting the time $\Delta T2$ from the time $\Delta T1$, a time required for round trip communication of the UWB signals (the first UWB signal and the second UWB signal) is calculated. Furthermore, by dividing the time by 2, a time required for one-way trip communication of the UWB signals is calculated. Furthermore, by multiplying a value of (time $\Delta T1$–time $\Delta T2$)/2 with a velocity of the signal, it is possible to obtain the distance (also referred to as a distance measurement value below) between the portable device 10 and the in-vehicle equipment 20.

Note that, during the above-described distance measurement, the UWB communication section 120 of the portable device 10 may transmit the first UWB signal, and receive the second UWB signal as the response to the first UWB signal.

In this case, the control section 130 can obtain the distance measurement value by obtaining information related to the time $\Delta T2$ from the in-vehicle equipment 20. Note that the control section 130 causes the UWB communication section 120 to transmit the distance measurement value to the in-vehicle equipment 20 in this case.

Hence, for example, the control section 130 according to the present embodiment may cause the UWB communication section 120 to transmit the first UWB signal in a case where BLE communication has been established.

According to the above-described control, in a situation that BLE communication is established and it is estimated that UWB communication can be also established likewise, it is possible to cause the UWB communication section 120 to transmit the first UWB signal, and avoid an event that the first UWB signal is unnecessarily transmitted in a situation that it is difficult to establish UWB communication.

On the other hand, the UWB communication section 120 of the portable device 10 may receive the first UWB signal, and transmit the second UWB signal as the response to the first UWB signal.

Note that the control section 130 causes the UWB communication section 120 to transmit the information related to the time $\Delta T2$ to the in-vehicle equipment 20 in this case, and consequently the in-vehicle equipment 20 can obtain the distance measurement value.

Therefore, for example, the control section 130 according to the present embodiment may perform control to enable the UWB communication section 120 to receive the first UWB signal in a case where BLE communication has been established.

That is, the control section 130 may cause the UWB communication section 120 to transition to a reception standby state in a case where BLE communication has been established instead of placing the UWB communication section 120 in the reception standby state (a state for receiving a signal) at all times.

According to the above-described control, it is possible to limit a timing at which the UWB communication section 120 transitions to the reception standby state to a timing at which the in-vehicle equipment 20 transmits the first UWB signal, and effectively suppress power consumption.

Note that functions of the control section 130 according to the present embodiment are realized by various processors.

The functional configuration example of the portable device 10 according to the present embodiment has been described. Note that the above-described functional configuration is only the example, and the functional configuration of the portable device 10 according to the present embodiment is not limited to this example. For example, the portable device 10 may further include an operation section that accepts a user's operation, and a display section that displays various pieces of information. The functional configuration of the portable device 10 according to the present embodiment can be flexibly altered according to a specification or an operation.

(In-Vehicle Equipment 20)

Next, a functional configuration of the in-vehicle equipment 20 according to the present embodiment will be described. The in-vehicle equipment 20 according to the present embodiment is an information processing device that is mounted on a movable body such as a vehicle.

Furthermore, the in-vehicle equipment 20 according to the present embodiment is an example of the control device and the communication device according to the present invention.

As illustrated in FIG. 1, the in-vehicle equipment 20 according to the present embodiment includes a BLE communication section 210, a UWB communication section 220, and a control section 230.

(BLE Communication Section 210)

The BLE communication section 210 according to the present embodiment performs BLE communication that is wireless communication compliant with the BLE communication standards with the portable device 10. The in-vehicle equipment 20 according to the present embodiment includes the at least one BLE communication section 210.

(UWB Communication Section 220)

The UWB communication section 220 according to the present embodiment performs UWB communication that is wireless communication compliant with the UWB communication standards with the portable device 10. The in-vehicle equipment 20 according to the present embodiment includes the at least one UWB communication section 220.

(Control Section 230)

The control section 230 according to the present embodiment controls each component of the in-vehicle equipment 20.

For example, the control section 230 according to the present embodiment controls BLE communication of the BLE communication section 210 and UWB communication of the UWB communication section 220.

In this regard, one of features is that the control section 230 according to the present embodiment performs control to start UWB communication in a case where BLE communication has been established.

According to such control, it is possible to avoid a state where the UWB communication section 220 is enabled to perform UWB communication at all times, and effectively suppress power consumption required for UWB communication.

Note that, more specifically, the control section 230 according to the present embodiment may cause the UWB communication section 220 to start a process related to transmission or reception of signals transmitted and received during UWB communication in a case where BLE communication has been established.

For example, a case is assumed where distance measurement based on the first UWB signal and the second UWB signal is performed as described above.

In this case, for example, the control section 230 according to the present embodiment may cause the UWB communication section 220 to transmit the first UWB signal in a case where BLE communication has been established.

According to the above-described control, in a situation that BLE communication is established and it is estimated that UWB communication can be also established likewise, it is possible to cause the UWB communication section 220 to transmit the first UWB signal, and avoid an event that the first UWB signal is unnecessarily transmitted in a situation that it is difficult to establish UWB communication.

Furthermore, for example, the control section 230 according to the present embodiment may perform control to enable the UWB communication section 220 to receive the first UWB signal in a case where BLE communication has been established.

According to the above-described control, it is possible to limit a timing at which the UWB communication section 220 transitions to the reception standby state to a timing at which the portable device 10 transmits the first UWB signal, and effectively suppress power consumption.

On the other hand, the positional relationship between the portable device 10 and the in-vehicle equipment 20 according to the present embodiment is not limited to a distance between the portable device 10 and the in-vehicle equipment 20. The above positional relationship includes for example, a direction of the portable device 10 for which the in-vehicle equipment 20 serves as a reference.

In a case where, for example, the in-vehicle equipment 20 according to the present embodiment includes the two or more UWB communication sections 220 (antenna elements), the control section 230 may estimate an Angle of Arrival (AoA) of the first UWB signal based on a phase difference between the first UWB signals received from the portable device 10 by the two or more UWB communication sections 220.

In this case, the control section 230 according to the present embodiment may perform control to enable the UWB communication sections 220 to receive the first UWB signals in a case where BLE communication has been established.

Furthermore, the control section 230 according to the present embodiment controls a control target device based on the positional relationship between the portable device 10 and the in-vehicle equipment 20 such as the distance between the portable device 10 and the in-vehicle equipment 20 and the direction of the portable device 10 for which the in-vehicle equipment 20 serves as the reference.

When, for example, deciding based on UWB communication that the portable device 10 and the in-vehicle equipment 20 have a predetermined positional relationship, the control section 230 according to the present embodiment may cause the control target device to execute a predetermined operation.

In an example, when deciding that the distance between the portable device 10 and the in-vehicle equipment 20 obtained by distance measurement based on UWB communication is within a predetermined range, the control section 230 may cause the control target device to execute the predetermined operation.

Furthermore, in an example, when deciding that the direction of the portable device 10 estimated based on UWB communication is within a predetermined range, the control section 230 may cause the control target device to execute the predetermined operation.

Furthermore, in an example, when deciding that the distance between the portable device 10 and the in-vehicle equipment 20 is within the predetermined range, and the direction of the portable device 10 for which the in-vehicle equipment 20 serves as the reference is within the predetermined range, the control section 230 may cause the control target device to execute the predetermined operation.

According to the above-described control, compared to a case where, for example, the control target device is controlled based on authentication that uses a signal of a Low Frequency (LF) range and a signal of an Ultra High Frequency (UHF) range, it is possible to exclude a risk of relay attacks, and realize more secure authentication.

Note that the control target device according to the present embodiment is, for example, a locking device that locks and unlocks a door of the movable body on which the in-vehicle equipment 20 is mounted, an engine, an accelerator, a brake, a steering device, and a lighting device.

When, for example, deciding that the portable device 10 and the in-vehicle equipment 20 have the predetermined positional relationship, the control section 230 according to the present embodiment may instruct the locking device to unlock the door.

Furthermore, when, for example, deciding that the portable device 10 and the in-vehicle equipment 20 have the predetermined positional relationship, the control section 230 according to the present embodiment may permit the engine to start.

Furthermore, when, for example, deciding that the portable device 10 and the in-vehicle equipment 20 have the predetermined positional relationship, the control section 230 according to the present embodiment may perform control to cause the movable body to autonomously park in a parking space.

Furthermore, when, for example, deciding that the portable device 10 and the in-vehicle equipment 20 have the predetermined positional relationship, the control section 230 according to the present embodiment may turn on the lighting device provided below the door of the movable body, and thereby assist the user to get on the movable body.

According to the above-described control, it is possible to control various processes according to the positional relationship between the portable device 10 and the in-vehicle equipment 20, and enhance user friendliness.

As described above, in a case where BLE communication has been established, the control section 230 according to the present embodiment may start UWB communication, and control the control target device based on the positional relationship between the portable device 10 and the in-vehicle equipment 20 estimated based on the UWB communication.

Furthermore, in this case, the control section 230 according to the present embodiment may decide whether or not BLE communication has been established, based on a second BLE signal transmitted by the portable device 10 as a response to a first BLE signal transmitted by the BLE communication section 210 during the BLE communication.

For example, the control section 230 according to the present embodiment may decide that the BLE communication has been established when a Received Signal Strength Indicator (RSSI) of the second BLE signal received by the at least one BLE communication section 210 exceeds a predetermined threshold.

An environment that can provide a sufficient received signal strength indicator during BLE communication makes it possible to expect that it is possible to obtain a sufficient received signal indicator likewise during UWB communication, too, and realize more stable UWB communication and control of the control target device based on the UWB communication.

Furthermore, for example, the control section 230 according to the present embodiment may decide that BLE communication has been established when the at least two or more BLE communication sections 210 receive the second UWB signals from the portable device 10.

An environment that enables the plurality of BLE communication sections 210 to communicate with the portable device 10 makes it possible to expect that it is possible to perform communication likewise during UWB communication, too, and realize more stable UWB communication and control of the control target device based on the UWB communication.

Furthermore, for example, the control section 230 according to the present embodiment may decide that BLE communication has been established when authenticity of the portable device 10 is verified based on the second BLE signal received by the BLE communication section 210.

In this case, for example, the first BLE signal transmitted by the BLE communication section 210 may be a signal for requesting an identifier such as an ID of the portable device 10, and the second BLE signal transmitted by the portable device 10 as the response to the first BLE signal may be a signal including the above identifier.

Furthermore, for example, the first BLE signal transmitted by the BLE communication section 210 may be a signal including, for example, a random number, and the second BLE signal transmitted by the portable device 10 as the response to the first BLE signal may include a calculation result (e.g., a hash value calculated by using a hash function) calculated by using the above random number and key information shared in advance.

According to the above control, it is possible to realize more secure UWB communication with a legitimate party by verifying the authenticity of the portable device 10 by BLE communication.

Furthermore, for example, the control section 230 according to the present embodiment may execute distance measurement based on the phase difference between the first BLE signal and the second BLE signal, and decide that BLE communication has been established when the obtained distance measurement value is within the predetermined range.

When the distance between the portable device 10 and the in-vehicle equipment 20 is within the predetermined range, it is possible to expect that UWB communication stabilizes more, and realize accurate control of the control target device based on the UWB communication.

A specific example where the control section 230 according to the present embodiment decides that BLE communication is established has been described above. By performing the above-cited decision alone or in combination, the control section 230 according to the present embodiment can accurately decide that BLE communication is established between the portable device 10 and the in-vehicle equipment 20.

Note that, when deciding that BLE communication has been established, the control section 230 may perform control to cause the BLE communication section 210 to transmit an establishment report that that indicates that BLE communication has been established to the BLE communication section 110 of the portable device 10.

According to the above control, the control section 130 of the portable device 10 can learn that BLE communication has been established, and control the UWB communication section 120.

On the other hand, the control section 130 of the portable device 10 may uniquely decide whether or not BLE communication has been established, based on each of the above-described conditions.

In this regard, when the distance measurement value is used as the decision condition, the portable device 10 needs to receive the response to the transmitted BLE signal from the in-vehicle equipment 20, and perform distance measurement. Hence, when receiving the second BLE signal, the BLE communication section 210 of the in-vehicle equipment 20 may transmit a third BLE signal as a response to the second BLE signal to the portable device 10.

Furthermore, the first BLE signal and the second BLE signal according to the present embodiment may be signals used to share between the portable device 10 and the in-vehicle equipment 20 share information for establishing UWB communication.

The above share information is, for example, information related to, for example, a frame configuration of a signal used for UWB communication or a rate relative to a signal transmission speed. Furthermore, the above share information may include an encryption key (or a random number used to generate the encryption key) used to encrypt a distance measurement signal or a data signal of UWB communication.

The above-described first BLE signal and second BLE signal can not only lower power consumption required for UWB communication by using BLE communication, but also share the share information that is necessary to establish UWB communication by using BLE communication, and realize more efficient communication.

<<1.2. Flow of Process>>

Next, the flow of the process of the system 1 according to the present embodiment will be described in detail. FIGS. 2 and 3 are sequence diagrams illustrating examples of the flow of the process of the system 1 according to the present embodiment.

In a case of the example illustrated in FIG. 2, the BLE communication section 210 of the in-vehicle equipment 20 transmits an advertise (S102).

Next, the BLE communication section 110 of the portable device 10 that has received the advertise in step S102 transmits a connection request to the BLE communication section 210 of the in-vehicle equipment 20 (S104).

Next, the BLE communication section 210 of the in-vehicle equipment 20 that has received the connection request in step S104 transmits the first BLE signal to the BLE communication section 110 of the portable device 10 (S106).

Next, the BLE communication section 110 of the portable device 10 that has received the first BLE signal in step S106 transmits the second BLE signal as the response to the first BLE signal (S108).

Next, the control section 230 of the in-vehicle equipment 20 makes decision on establishment of BLE communication based on the second BLE signal received in step S108 (S110).

In this case, for example, the control section 230 may decide whether or not BLE communication is established, based on the received signal strength indicator of the second BLE signal.

Furthermore, for example, the control section 230 may decide whether or not BLE communication is established, based on the number of the BLE communication sections 210 that have received the second BLE signals.

Furthermore, the control section 230 may make decision on the authenticity of the portable device 10 based on the second BLE signals, and establish BLE communication based on a result of the decision.

When deciding in step S110 that BLE communication has been established, the control section 230 performs control to start UWB communication that uses the share information shared by the first BLE signal and the second BLE signal.

For example, the control section 230 may perform control to cause the BLE communication section 210 to transmit the establishment report that indicates that BLE communication has been established to the BLE communication section 110 of the portable device 10 (S112).

In this case, the control section 130 of the portable device 10 causes the UWB communication section 120 to transition to the reception standby state for receiving the first UWB signal, based on a fact that the BLE communication section 110 has received the establishment report in step S112 (S114).

Furthermore, as illustrated in FIG. 3, the control section 230 of the in-vehicle equipment 20 performs control to cause the UWB communication section 220 to transmit the first UWB signal (S116).

Next, the UWB communication section 120 of the portable device 10 transmits the second UWB signal as the response to the first UWB signal received in step S116 (S118).

Next, the control section 230 of the in-vehicle equipment 20 makes decision on the positional relationship between the portable device 10 and the in-vehicle equipment 20 obtained based on the first UWB signal and the second UWB signal (S120). Note that the first UWB signal and the second UWB signal according to the present embodiment may be implemented as sequences obtained by encrypting pulse sequences for obtaining the positional relationship.

In this case, the control section 230 may decide, for example, whether or not the distance between the portable device 10 and the in-vehicle equipment 20 is within the predetermined range, or may decide whether or not the direction of the portable device 10 for which the in-vehicle equipment 20 serves as the reference is within the predetermined range. Furthermore, the control section 230 may decide whether or not the position of the portable device 10 calculated based on the above distance and direction is within the predetermined range.

When deciding in step S120 that the portable device 10 and the in-vehicle equipment 20 have the predetermined positional relationship, the control section 230 subsequently performs control to cause the control target device to execute the predetermined operation (S122).

The flow of the process of the system 1 according to the present embodiment has been described above citing the example. Note that the above-described flow of the process is only the example, and the process of the system 1 according to the present embodiment is not limited to this example.

For example, as described above, the first UWB signal according to the present embodiment may be transmitted by the portable device 10, or the second UWB signal may be transmitted by the in-vehicle equipment 20.

In this case, after deciding in step S110 that BLE communication has been established, the control section 230 of the in-vehicle equipment 20 causes the UWB communication section 220 to transition to the reception standby state. Furthermore, the control section 130 of the portable device 10 causes the UWB communication section 120 to transmit the first UWB signal based on the fact that the BLE communication section has received the establishment report in step S112.

Furthermore, FIG. 3 illustrates that each of the processes in steps S116 to S122 is performed once. However, each of the processes may be repeatedly executed. That is, the system 1 according to the present embodiment may continue executing capturing the position of the portable device 10 after BLE communication is established.

According to the above-described continuous process, when, for example, it is detected that the portable device 10 is located near the outside of the door of the vehicle on which the in-vehicle equipment 20 is mounted, the door is unlocked, and, when it is subsequently detected that the portable device 10 is located in a vehicle interior of the movable body, the engine is permitted to start, that is, it is possible to realize various types of control according to the positional relationship between the portable device 10 and the in-vehicle equipment 20.

Note that, in this case, the in-vehicle equipment 20 may be triggered by for example, start of the engine to finish the process related to capturing of the position of the portable device 10. In this case, the end of the process may be shared with the portable device 10 via one of UWB communication and BLE communication.

On the other hand, in, for example, a case where the engine is stopped or a case where the door of the movable body is opened, the in-vehicle equipment 20 may be triggered by these cases to resume capturing the position of the portable device 10. In this case, the in-vehicle equipment 20 may resume the process from transmission of the advertise in step S102 illustrated in FIG. 2.

Note that, in a case where locking of the door of the movable body is subsequently instructed or a case where a state where the distance between the portable device 10 and the in-vehicle equipment 20 is a predefined distance apart continues for a predefined time or more, the in-vehicle equipment 20 may be triggered by these cases to finish the process related to capturing of the position of the portable device 10.

Thus, it is possible to flexibly alter the flow of the process of the system 1 according to the present embodiment.

2. Supplementary Explanation

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

Furthermore, a series of processes of each apparatus described in this specification may be realized by using one of software, hardware and a combination of the software and the hardware. Programs that configure the software are stored in advance in, for example, a non-transitory storage medium provided inside or outside each apparatus. Furthermore, each program is read on an RAM when, for example, executed by a computer, and is executed by a processor such as a CPU. The above storage medium is, for example, a magnetic disk, an optical disk, a magneto-optical disk or a flash memory. Furthermore, the above computer programs may be distributed via, for example, a network without using the storage medium.

What is claimed is:

1. A control device, comprising:
   a processor; and
   a memory including at least one program that, when executed by the processor, causes the processor to perform processes, the processes including:
   causing Bluetooth® Low Energy (BLE) communication to be performed with another communication device, the BLE communication being wireless communication compliant with BLE communication standards;
   causing Ultra Wide Band (UWB) communication to be performed with the another communication device, the UWB communication being wireless communication compliant with UWB communication standards; and
   controlling the BLE communication and the UWB communication,
   wherein the processor causes UWB communication of the another communication device to transition to a reception standby state and performs control to start the UWB communication with the another communication device in a case where the BLE communication has been established.

2. The control device according to claim 1,
wherein the processor decides whether or not the BLE communication has been established, based on a second BLE signal transmitted by the another communication device as a response to a first BLE signal transmitted by the control device during the BLE communication.

3. The control device according to claim 2,
wherein the processor decides that the BLE communication has been established when a received signal strength indicator of the second BLE signal received by the control device exceeds a predetermined threshold.

4. The control device according to claim 2,
wherein the processor decides that the BLE communication has been established when at least two or more BLE communication sections of the control device receive the second BLE signal.

5. The control device according to claim 2,
wherein the processor decides that the BLE communication has been established when authenticity of the another communication device is verified based on the second BLE signal.

6. The control device according to claim 2, wherein
the first BLE signal and the second BLE signal are signals used between the control device and the another communication device to share information for establishing the UWB communication, and
the processor performs control to start the UWB communication that uses the information in the case where the BLE communication has been established.

7. The control device according to claim 1,
wherein the processor starts a process related to transmission or reception of a signal transmitted or received during the UWB communication in the case where the BLE communication has been established.

8. The control device according to claim 7,
wherein the processor causes transmission of a first UWB signal used to estimate a positional relationship between the control device and the another communication device in the case where the BLE communication has been established.

9. The control device according to claim 7,
wherein the processor performs control to enable the control device to receive a first UWB signal used to estimate a positional relationship between the control device and the another communication device in the case where the BLE communication has been established.

10. The control device according to claim 1,
wherein, when deciding based on the UWB communication that the control device and the another communication device have a predetermined positional relationship, the control section causes a control target device to execute a predetermined operation.

11. The control device according to claim 1,
wherein the control device is mounted on a movable body.

12. The control device according to claim 1,
wherein the processor causes the UWB communication of the another communication device to transition to the reception standby state by transmitting an establishment report to the another device that indicates that the BLE communication has been established.

13. A non-transitory storage medium having a program stored therein, the program causing a computer to realize processes, the processes including:
performing Bluetooth® Low Energy (BLE) communication with another communication device, the BLE communication being wireless communication compliant with BLE communication standards;
performing Ultra Wide Band (UWB) communication with the another communication device, the UWB communication being wireless communication compliant with UWB communication standards; and
controlling the BLE communication and the UWB communication,
wherein the program causes the computer to cause UWB communication of the another communication device to transition to a reception standby state and to perform control to start the UWB communication with the another communication device in a case where the BLE communication has been established.

14. A system comprising:
a processor; and
a communication device, wherein
the processor is configured to:
cause Bluetooth® Low Energy (BLE) communication to be performed with the communication device, the BLE communication being wireless communication compliant with BLE communication standards;
cause Ultra Wide Band (UWB) communication to be performed with the communication device, the UWB communication being wireless communication compliant with UWB communication standards; and
control the BLE communication and the UWB communication, and
the processor causes UWB communication of the communication device to transition to a reception standby state and performs control to start the UWB communication with the communication device in a case where the BLE communication has been established.

* * * * *